US007404205B2

(12) United States Patent
Scoredos et al.

(10) Patent No.: US 7,404,205 B2
(45) Date of Patent: Jul. 22, 2008

(54) SYSTEM FOR CONTROLLING CLIENT-SERVER CONNECTION REQUESTS

(75) Inventors: Eric C. Scoredos, Boulder Creek, CA (US); Hrishikesh Talgery, Cupertino, CA (US); David Hsing Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 899 days.

(21) Appl. No.: 10/453,043

(22) Filed: Jun. 3, 2003

(65) Prior Publication Data

US 2004/0250127 A1 Dec. 9, 2004

(51) Int. Cl.

*G06F 11/00* (2006.01)
*G06F 15/16* (2006.01)
*H04L 9/00* (2006.01)

(52) U.S. Cl. ............................ 726/13; 726/14; 726/22; 713/168; 709/228

(58) Field of Classification Search .................. 726/11, 726/12, 13; 713/168

See application file for complete search history.

(56) References Cited

U.S. PATENT DOCUMENTS 5,107,489 A * 4/1992 Brown et al. ................ 370/360
5,592,622 A * 1/1997 Isfeld et al. ................ 709/207
6,026,082 A * 2/2000 Astrin ........................ 370/336
6,101,189 A * 8/2000 Tsuruoka .................... 370/401
6,546,425 B1 * 4/2003 Hanson et al. .............. 709/227
6,633,539 B1 * 10/2003 Basso et al. ................. 370/229
7,106,736 B2 * 9/2006 Kalkunte .................... 370/391
2002/0176426 A1 11/2002 Asano et al.

FOREIGN PATENT DOCUMENTS

JP 2001-313640 11/2001
JP 2002-344530 11/2002

OTHER PUBLICATIONS

Yoshida, Takayuki; Notification of Reason For Rejection in JP 2004-165237 with English Translation; Japanese Patent Office, Aug. 1, 2006.

* cited by examiner

*Primary Examiner*—Benjamin E. Lanier
*Assistant Examiner*—Abdulhakim Nobahar

(57) ABSTRACT

A method for controlling connections from an IP entity to a server. Initially, a limit count, representing a number of concurrently allowable connections between the IP entity and the server, is determined. When an incoming IP packet is received, the packet is processed to determine the source and destination IP addresses for the packet. An entry is then created in a limit table for the IP entity, if no entry for that IP entity exists in the table. A determination is made as to whether a pending connection should be allowed for the packet, by referring to the limit count and the entry in the limit table. The connection is allowed, and the limit count for the entry is incremented, if the attempted connection would not exceed the limit count for the IP entity; otherwise, the packet is blocked if the attempted connection would exceed the limit count for the IP entity.

27 Claims, 8 Drawing Sheets

SYSTEM FOR CONTROLLING CLIENT-SERVER CONNECTION REQUESTS

RELATED APPLICATIONS

The present application is related to the material of co-pending, co-filed, U.S. patent application Ser. No. 10/453, 102, entitled Method and Program Product for Reducing Database Walk Frequency While Repetitively Accessing A Firewall Connection and Rule Database, the disclosure of which is hereby incorporated herein by reference.

BACKGROUND

A computer network firewall is a programmed processor, or a subsystem thereof, connected to a gateway or other network server, that monitors messages destined for a recipient within an internal network. A firewall blocks those messages that meet predetermined criteria, which may include specific packet source addresses or message content. In typical firewalls, connections between a sending client and a network recipient are accepted or rejected by comparing parameters of incoming TCP/IP packets to rules that determine whether a given transmission should be allowed or blocked. To determine if a specific message is a legitimate message or unwanted 'spam', including advertising, malicious bulk transmissions, and/or other unsolicited email, the network traffic must be analyzed and specific clients identified who are sending the unwanted messages.

Although presently existing firewall systems provide the basic capability of screening incoming messages, the systems' rules must be set up or programmed to detect specific clients whose messages are to be blocked or rejected. System administrators frequently spend a great deal of time not only analyzing logged information to discover which clients have been trying to overwhelm their system with incoming connection requests, but also configuring specific rules to limit the access of particular 'spammers' to their internal network.

Many existing firewalls are content-based, that is, they read or scan the actual messages themselves. Content-based message screening is costly from a computer resource standpoint, and also presents potential privacy problems. It is known that content-based firewalls often reject some legitimate messages. Although it is important that a firewall be able to detect as many unwanted messages as possible, it is equally, if not more important, that the firewall not block or reject legitimate email or other transmissions.

Furthermore, to administer a system which controls incoming TCP/IP connections, it is desirable to generate accurate reports describing incoming traffic from system clients and the number of connection attempts that are in excess of a predetermined connection limit. Previously known activity logging methods are inefficient. These methods include (1) keeping in-kernel memory tables, which are difficult to maintain because it if difficult to know when logging information about a specific incoming system is not necessary, and (2) logging each over-limit TCP/IP SYN (connection) packet, which generates an extremely large number of log messages.

SUMMARY

A system is disclosed for controlling connections from an IP entity to a server. Initially, a limit count, representing a number of concurrently allowable connections between the IP entity and the server, is determined. When an incoming IP packet is received, the packet is processed to determine the source and destination IP addresses for the packet. An entry is then created in a limit table for the IP entity, if no entry for that IP entity exists in the table. A determination is made as to whether a pending connection should be allowed for the packet, by referring to the limit count and the entry in the limit table. If the attempted connection would not exceed the limit count for the IP entity, the connection is allowed, and the limit count for the entry is incremented; otherwise, the packet is blocked if the attempted connection would exceed the IP entity's limit count.

DETAILED DESCRIPTION

Figure 1:
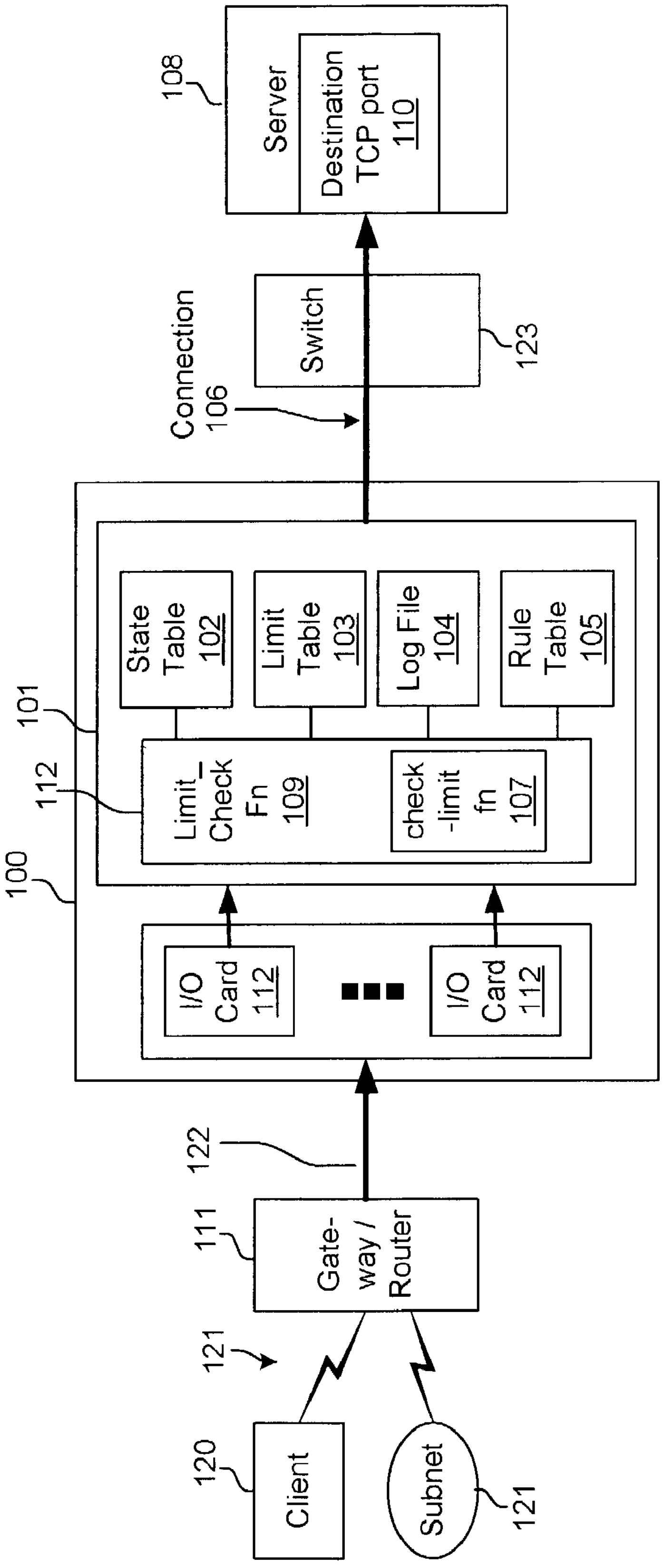
FIG. 1 is a block diagram of one embodiment of an exemplary system for limiting concurrent connections from a client to a server.

FIG. 1 is a block diagram of one embodiment of an exemplary system for limiting concurrent connections from a client to a server. The present DCA (Dynamic Connection Allocation) firewall system 100 comprises a set of rules and monitoring commands. As shown in FIG. 1, in an exemplary embodiment, firewall 100 typically filters traffic between e-mail clients 120 and SMTP (Simple Mail Transport Protocol) servers 108, although, in alternative embodiments the firewall 100 may be used to filter transmissions using other protocols, such as POP3 (Post Office Protocol). IP (Internet Protocol) packets destined for server 108 are sent from client 120 via network 121, such as the Internet, through a gateway and/or router 111, and system interface cards 112, after which the packets encounter DCA firewall 100.

Firewall 100 analyzes inbound TCP/IP connection request packets, using a table of rules 105 to determine how many concurrent connections 106 a particular source IP, destination IP, and destination TCP port 110 should be allowed. IP packets are then forwarded, via switch 123 on the outbound interface, to server 108. DCA Firewall 100 comprises a filter 101 that includes filtering functions executed on processor 112, including a connection limit checking function ['fn limit_check( )'] 109 that uses associated files and tables 102-105 stored in processor-accessible memory.

DCA firewall 100 limits the number of connections that an IP entity (e.g., a client or subnet), can make concurrently to a server, and allows a system administrator to configure an explicit limit to the number of connections from a particular client or subnet that can be active at one time:

- by individual IP address;
- by IP subnet (CIDR) range;
- each address having an individual limit configured to the subnet; or,
- all addresses in the subnet range share a cumulative limit; and
- by default.

IP addresses without an explicit limit can be assigned a default; individual limit for the number of concurrent connections permitted. The system administrator can configure whether the connection is dropped or a RST packet is returned (which resets the connection) when a connection is blocked.

The present system uses broadly scoped 'keep-limit' rules to identify categories of client systems and then restrict concurrent connection requests from specific clients 120 or groups of clients to a pre-configured limit. A default rule identifies all other clients and also subjects them to a pre-configured connection limit.

The following is exemplary syntax for the DCA 'keep limit' rules: pass [return-rst] in [log | log limit [freq <num>]] quick proto tcp from <IP | IP_subnet | any> to <IP | IP_subnet | any> [port = <num>] keep limit <limit> [cumulative]

The keep-limit rule syntax is explained below:

1. pass [rtn-reset]—This directs DCA system 100 to permit connections when the limit count is not exceeded, but to send a reset (TCP RST) if the configured limit 'limit count' is exceeded.

2. [log|log limit]—this directs the DCA system to log the connection. If 'log' is used the entire session is logged and if 'log limit' is used, only the SYN packets of over-limit connection attempts are logged. Logging is described in detail in the "Summary Logging" section below.

3. The source address can be a wild card, a specific IP or a IP subnet. The destination IP address also must conform to the same syntax as the source IP address.

4. A source ULP (upper level protocol) port cannot be specified.

5. Destination ports can be a wildcard or a resolved port. But port ranges cannot be specified.

6. the 'keep limit' keywords specify the number of concurrent connections in >=established state. So if the IP address allowed 10 connections, an $11^{th}$ connection will be blocked. A TCP RST packet is returned to the source IP address/TCP port if the rule has the 'rtn-reset' keyword.

7. The <limit type> keyword specifies the type of limit which being kept. This is explained in more detail in the next section. The only limit type explicitly specified is 'cumulative'.

Figure 2:
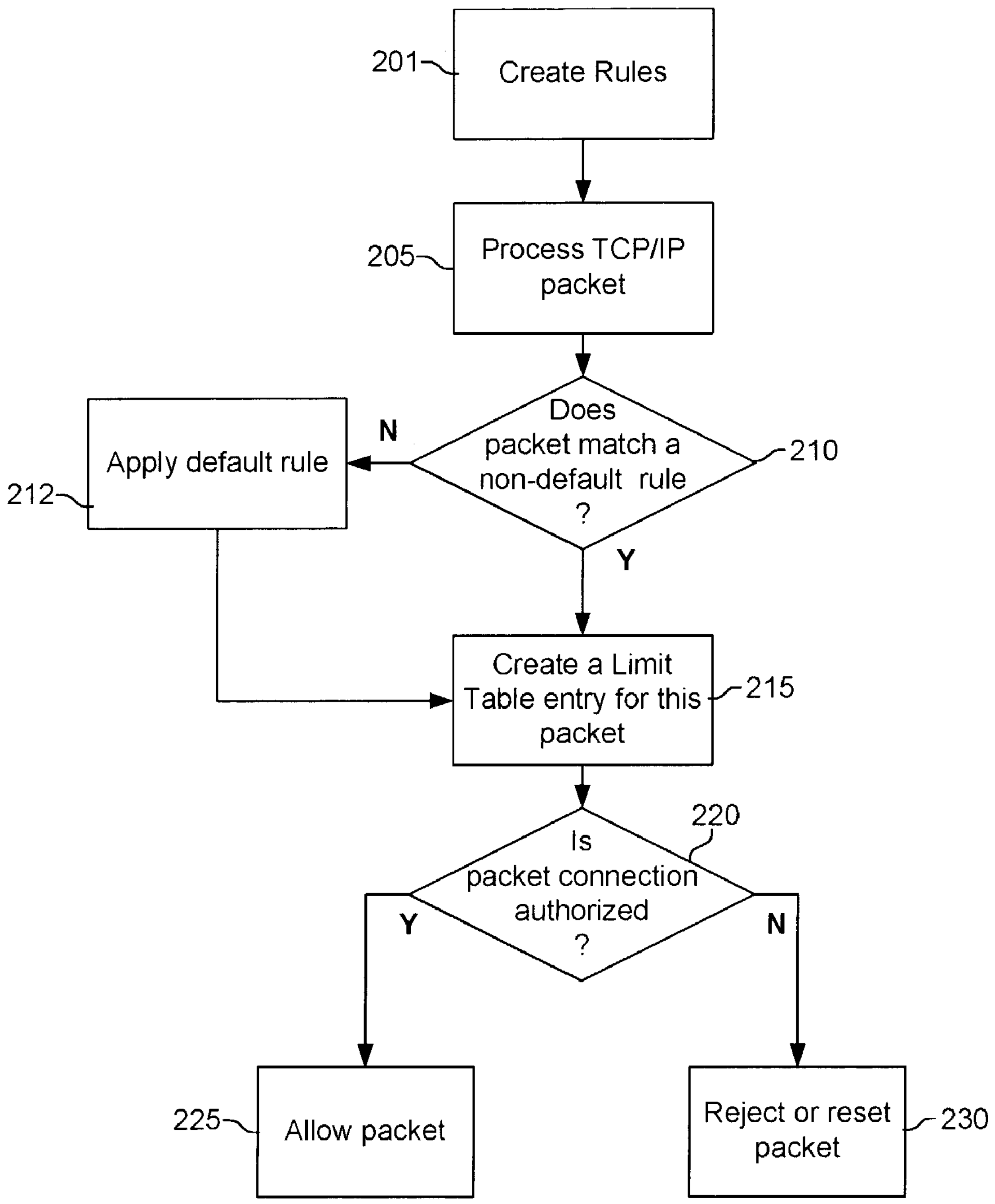
FIG. 2 is a flowchart illustrating exemplary steps performed during operation of the system of FIG. 1.

FIG. 2 is a flowchart illustrating exemplary steps performed during operation of the system of FIG. 1. Initially, as shown in FIG. 2, at step 201 a system administrator or other user configures the number of concurrently acceptable connections for specific clients or client groups by entering 'keep limit' rules into rule table 105 for each client and client group, or subnet. These rules (described in detail below) can specify a range of source and destination addresses and destination ports and the number of concurrent connections to permit. The connection limit can be set to a single count for an explicit source that matches the rules or set to a cumulative count for all clients that match the rules.

The present system 100 uses a rule structure, stored in rule table 105, comprising the following fields:

(1) fn_limit contains current limit for the IP (address) if a cumulative connection limit has been configured for a particular subnet 121, for example.

(2) fn_threshold specifies the maximum number of concurrent established connections that are allowed for any source IP. If the limit type is cumulative, then fn_limit is checked against this.

(3) fn_lock is used to protect changes to the current limit count held in 'fn_limit' when the limit type is cumulative.

(4) fn_limit_excd keeps track of number of times the limit would have been exceeded. This is incremented by fn_check-limit( ) every time the current limit exceeds the configured limit.

At step 205, an incoming TCP/IP packet is received and processed to determine the source and destination addresses and destination ports. At step 210, limit table entry hash table ('limit table') 103, which can be quickly checked, is examined to determine if a new connection should be allowed.

In an exemplary embodiment, DCA firewall 100 limits IP connections in four ways:

1. Per IP: Here the source IP is a fully resolved IP address and the configured limit is counted against each of the connection targets the client makes distinguished by destination IP address and/or destination TCP port.

2. Subnet: Here the source is an IP subnet 121 in CIDR (Classless Inter-Domain Routing) format, e.g., 15.10.130.0/24. In this case the configured limit is counted against each fully resolved IP in the 15.10.130.0/24 subnet.

3. Cumulative: In this case also the source and/or destination is specified as a IP subnet 121. However, all the IPs in that subnet share the configured limit. So if the configured limit is 10 and there are 5 established connections from 15.10.130.76 and five more from the 15.10.130.136, then no more connections will be allowed from the 15.10.130.0/24 subnet.

4. Default: All source IPs which do not match any rule and have not been categorized by any of the above limit types are will have the Default limit type. Thus, if the configured limit is 10, each of the IPs which fall in this category will be allowed a maximum of 10 established connections. This also enables DCA to limit unknown IP addresses to a configurable connection limit.

In an exemplary embodiment, limit table 103 entries are hashed by source IP address, destination IP address, and destination TCP port number. This hashing structure permits the IP addresses and destination TCP port to be a specific IP address, subnet, any IP address or subnet (i.e., wildcard match), or a specific port number or any port number. This hashing scheme ensures that a wildcard or subnet IP value in a rule for a source and destination IP address or destination port number will not cause a bad match. Because the limit table entry is identified by its Source IP Address, Destination IP Address, and Destination UL (upper level) Port, the correct limit table entry will always be found even with rules that specify specific limits for specific IP/TCP parameters which would also match more general wildcard rules. With the above hashing scheme, the limit table entry for any specific IP src/dst (source/destination) UL port combination will be found while walking the hash list. Only when no specific matching entry is found, is a new limit table entry created after consulting the rule table to determine the correct limit value. Therefore, specific entries will always be found before using a wildcard to create a new entry.

In an exemplary embodiment, limit (hash) table 103 has the structure shown below:

```
typedef struct fn_limit_hash {
lock_t lock; /* lock for this hash bucket chain */
fn_limit_t *pnext; /* ptr to next hash bucket element */
int init; /* Boolean set when lock is initialized */
} fn_limit_hash_t;
```

An exemplary data structure for entries in limit table 103 is shown below:

```
typedef struct fn_limit {
struct fn_limit *pnext; /* ptr to next hash entry in bucket */
struct in_addr src;
struct in_addr dst;
int sport; /* this only reflects the first connx */
```

```
int dport;
int limit_thresh; /* The limit for this IP */
int limit_cur; /* The current limit for this IP */
int limit_type; /* individual, cumulative, subnet */
struct fentry_t *fin_fr; /* ptr to rule of this entry */
} fn_limit_t;
```

Note that the "rule" which created the limit table entry is also incorporated in the limit table entry data structure. Each time an individual, subnet, or default rule is processed for the first time a limit table entry is created. Note that packets that match a 'cumulative subnet' rule do not have a limit table entry; instead the maximum number of connections permitted and the current connection count are kept in the rule itself. This is so that all the packets that match the cumulative rule can share the same count of current and maximum connections.

When a TCP/IP packet is processed that matches a configured rule, a limit table entry is created, at step 215 for this client, if one does not already exist. If the packet does not match any of the rules in rule table 105, a default rule is applied, at step 212, and a limit table entry is then created at step 215.

Whenever this client attempts a TCP/IP connection to the same Destination Server and Server TCP service (SMTP ([e-mail]), HTTP (web server), telnet and rlogin (remote connections), or whatever other server service is identified by the destination TCP port, the connection is checked against the appropriate rule at step 220, and is allowed (at step 225) or blocked (at step 230) depending upon the current connection count in the corresponding limit table entry. If the connection is allowed, then the current connection count is incremented. The connection limits specified in the limit table entry can be dynamically updated by updating the limit count in the corresponding rule. An incoming connection request can be blocked or a TCP reset can be returned depending on the action specified in the rule.

When processing connections built from DCA rules, the entry in state table 102 created at step 215 is used to track the TCP state transitions caused by TCP packets exchanged between client 120 and server 108, to determine establishment and termination of connections. The entry in limit table 103 is created to keep track of the current number of connections for a particular source IP, destination IP address, and destination port and the number of connections the DCA rule allows. A special type of DCA rule establishes a "cumulative limit" for a group of IP addresses keeps its current limit in the rule itself; there is no 'limit table' entry for cumulative connections.

Processing by the present system 100 only requires that the connection setup and teardown needs to be tracked for the purpose of keeping track of connection limits. State table 102 provides this function.

Figure 3:
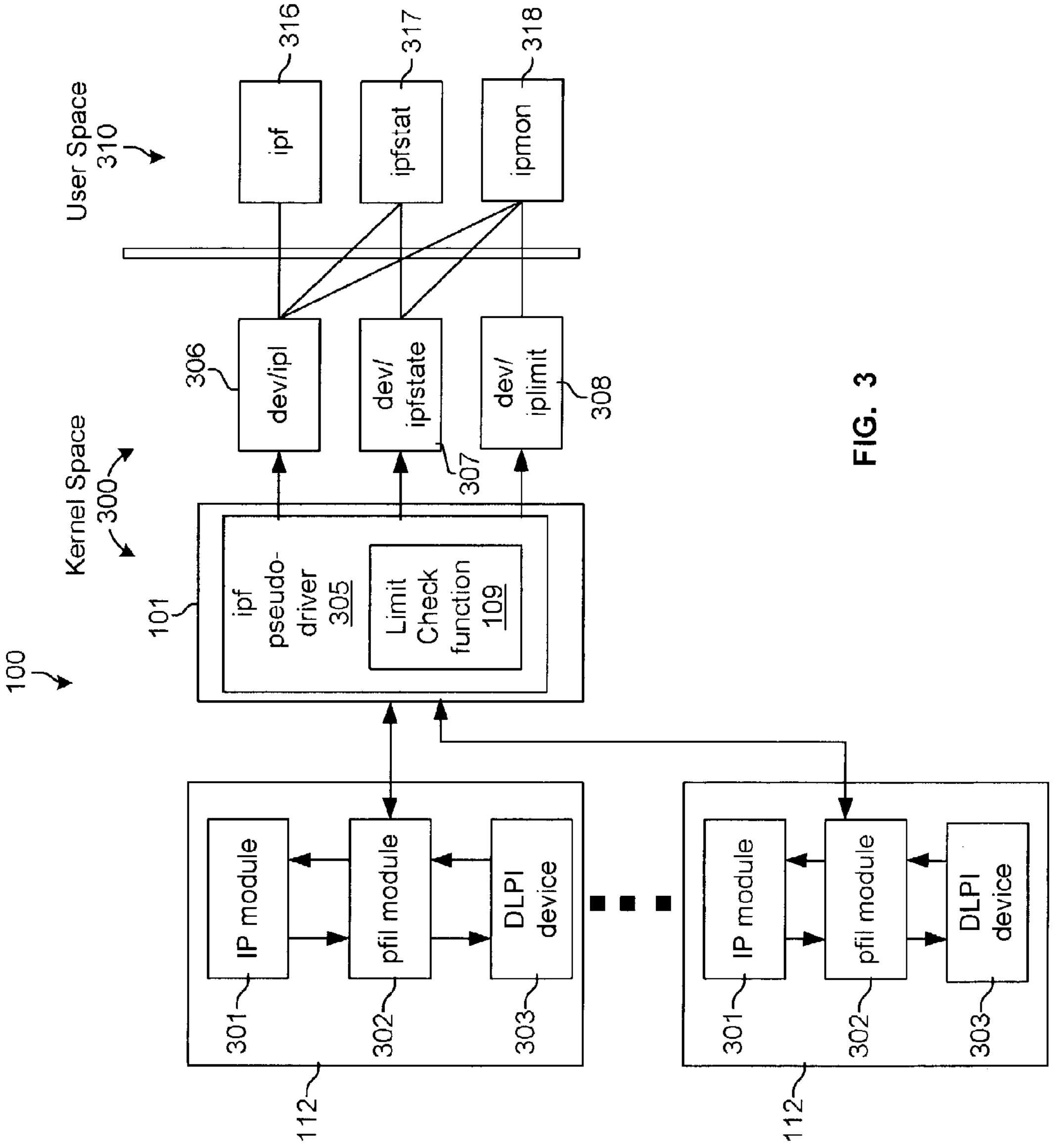
FIG. 3 illustrates exemplary basic architecture of DCA firewall system 100.

FIG. 3 illustrates the basic architecture of DCA firewall system 100. As shown in FIG. 3, DCA firewall 100 includes one or more 'pfil' modules 302, located on each system interface card 112, and an 'ipf' pseudo-driver 305. Each pfil module sends IP packets to ipf pseudo-driver 305 for rule processing and connection limit checking. Each pfil module 302 is pushed between IP module 301 and DPLI device 303 on each system interface card 112. A routine in pfil 302 calls fn_limit_check( ) 109 in ipf pseudo-driver 305 to process each IP packet according to configured filtering rules, as described herein. In an exemplary embodiment, the present system 100 processes only incoming TCP/IP packets, but other packet types may be processed in alternative embodiments.

The ipf pseudo-driver 305 uses pseudo-devices 306-308 to let the administrator configure rules and other functions via commands handled by modules 316-318. The ipf command, handled by module 316 and pseudo-device /dev/ipl 306, is used for administrative functions. The ipstat command, handled by module 317 and pseudo-devices dev/ipl 306 and dev/ipstate 307, is used to collect monitoring information including firewall filter statistics. The ipmon command, handled by module 318 and pseudo-devices dev/ipl 306 and dev/iplimit 308, is used to get logging records from the ipf kernel module. Pseudo-devices 306-308 reside in kernel space 300, and drive modules 316-318, which reside in user space 310, as indicated above.

Figure 4:
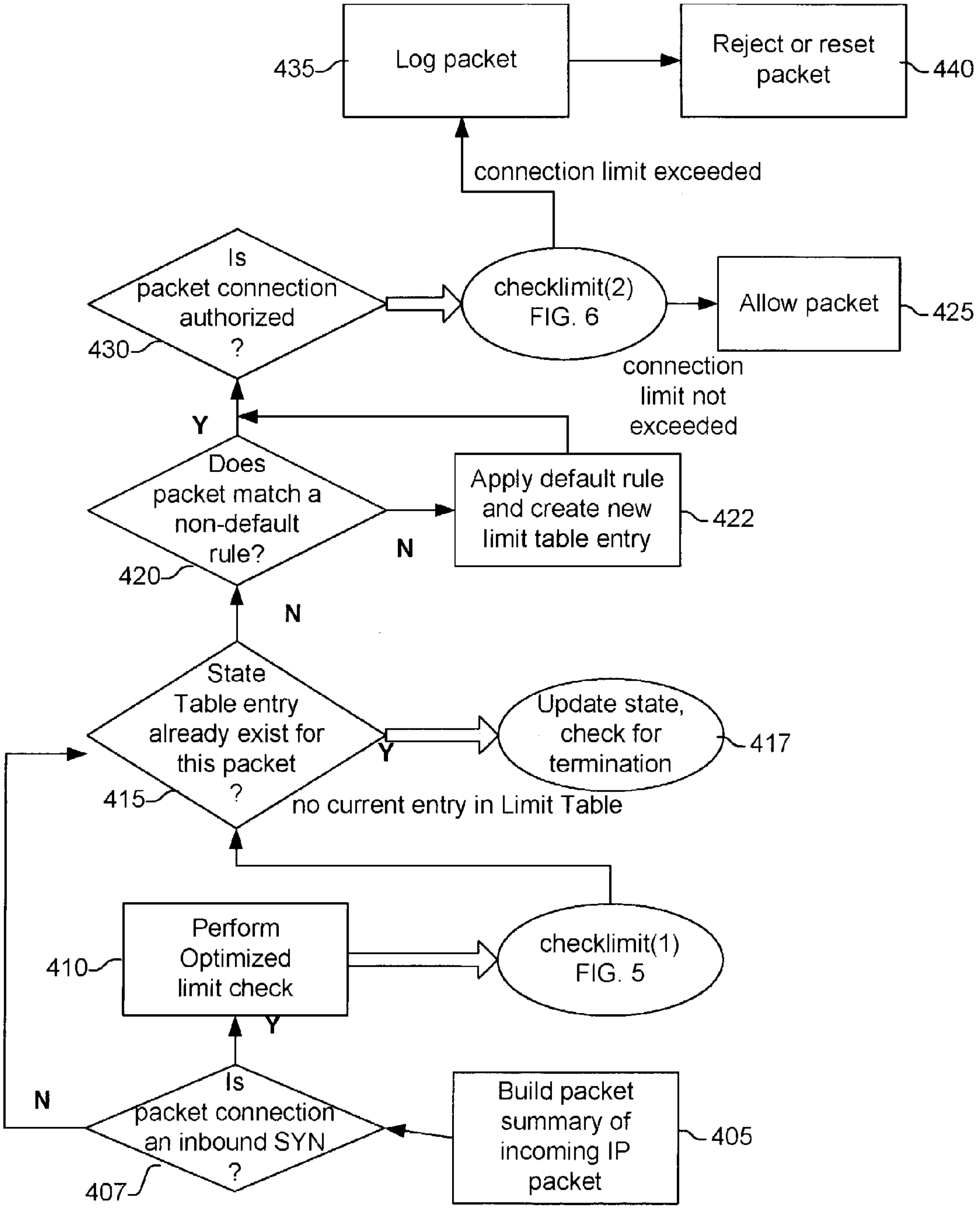
FIG. 4 is a flowchart further illustrating exemplary steps performed during operation of the system of FIGS. 1 and 3.

FIG. 4 is a flowchart further illustrating exemplary steps performed during operation of the system of FIGS. 1 and 3. IP packets that enter ipf pseudo-driver 305 from pfil module 302 are first processed by a routine fn_limit_check( ) 109, which performs functions analogous to those typically provided by existing firewalls, such as Hewlett-Packard's IP Filter product. These typical firewall functions are shown in steps 405, 415, 420, 425, 430, and 440. As shown in FIG. 4, at step 405, fn_limit_check( ) first builds a summary of a packet incoming on line 122 (FIG. 1). This packet summary includes relevant elements of the IP/TCP Packet, and also stores information associated with processing the packet, such as the rule the packet matches and a UID (unique identifier) that indicates whether the limit table data structure needs to be revalidated.

At step 407, the incoming packet is checked to determine whether it is a SYN packet. If there is one 'keep limit' rule enabled (i.e., the DCA firewall 100 has not been 'disabled' by the system administrator), then if (1) the packet is inbound, (2) is a SYN only packet (that is, not a SYN/ACK), and (3) the Upper layer Protocol (ULP) is TCP, a call to a connection limit-checking subroutine 107, fn_checklimit( ), is made, at step 410, to see if a limit table entry already exists for this IP address/TCP destination port 3-tuple. The initial call to fn_checklimit( ) is indicated by a function argument of "1", i.e., fn_checklimit(1). Details of the operations performed during the initial call to limit-checking subroutine 107 are described with respect to FIG. 5, below.

Essentially, the purpose of the initial call to subroutine 107 is to avoid rule table processing whenever possible, as a linear search is used to search the rule table hash list. If there is already an existing limit table entry for a specific IP addr/dest ULP port 3-tuple, a determination can be made immediately as to whether the new connection should be accepted or rejected based on the current limit count for that entry in limit table 103. Furthermore, a new connection state entry can be added immediately if the limit count of the entry permits it.

In the call to fn_checklimit(1), if there is a limit table entry in limit table 103, a check is then made to see whether it is permitted to add a new connection without exceeding the connection limit specified in the rule. If a new connection is not permitted, the connection is rejected or blocked. Alternatively, a 'reset' command may be returned to the client if the rule so specifies. If there is no current limit table entry for the packet, a 'continue' argument is returned and fn_limit_check( ) continues to process the packet.

At step 415, if there is already an entry in state table 102 for the ULP ports/IP addrs/protocol 5-tuple, then at step 417, the state table is updated accordingly, and a check is made to see if the connection has been terminated. Non-Syn packets are processed in the state table which records transitions in the TCP connection. When it is detected that either the client or server has sent a FIN or RST packet to close the connection, the connection is transitioned to a CLOSE_WAIT state and fn_dellimit( ) (described below) is called to decrement the limit table entry's connection count and remove the limit table entry if the connection count is zero. Note that the state table entry has a pointer to the limit table entry associated with it so the hash list does not have to be traversed again. Otherwise, if no state table entry presently exists for this packet, then at step 420 a call is made to a subroutine [fn_scanlist( )] to see if the packet matches a rule in rule table 105. In the present system 100, the administrator must configure the rule table such that the last rule in the table, the so-called “default rule”, specifies a wildcard “from any” to “to any” rule that specifies a default limit count for incoming connection requests that do not match any other rule in rule table. At step 422, if the default rule is applied, an entry for the present packet is created in limit table 103.

If, at step 420, there is a matching rule in rule table 105 for the present packet, then at step 430, a check is made, via a call to fn_checklimit(2) to determine if the packet connection is authorized, as described in detail with respect to FIG. 6, below. Depending on the above processing the packet may be dropped or reset (step 440), or allowed to pass through pfil module 302 to the appropriate IP module 301 (step 425) to be forwarded to its destination server 108.

At step 435, if the packet is not allowed, a check is made to determine if the packet should be logged. Packet logging is described below with respect to FIG. 8.

As indicated above, steps 405, 415, 420, 425, 430, and 440 in FIG. 4 are typically provided by existing firewalls. The present system 100 inserts a call to fn_checklimit(1) in step 410 and modifies step 430 above by including a call to fn_checklimit(2) to perform ‘keep limit’ processing, as described below.

Figure 5:
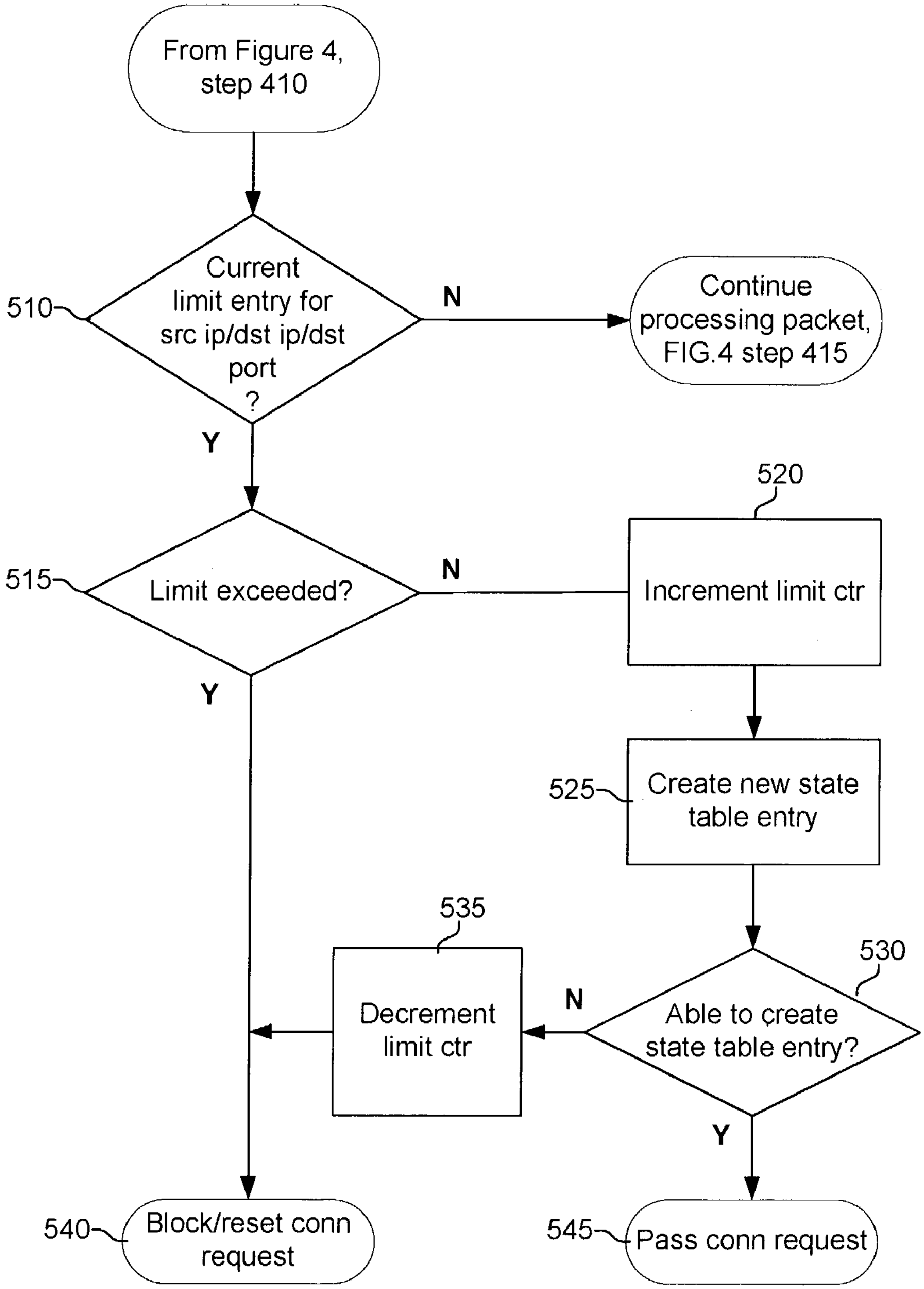
FIG. 5 is a flowchart illustrating exemplary steps performed in step 410 of FIG. 4.

FIG. 5 is a flowchart illustrating exemplary steps performed in the fn_checklimit(1) code called from step 410 in FIG. 4. This call from fn_limit_check( ) to fn_checklimit(1) in step 410 is an optimization. It permits bypassing the expensive linear rule search in step 420 in FIG. 4 by checking if a limit table entry exists for a given source ip/destination/ip/destination port when a new connection indication (inbound TCP SYN packet) is encountered.

As shown in FIG. 5, at step 510, a check is made to determine if there is a current entry for the present packet in limit table 103. If no such entry is found, then connection limit processing continues back in fn_limit_check( ) at step 415 in FIG. 4. If a matching entry is found, then at step 515, the current connection limit counter (‘limit_cur’, in ‘struct fn_limit’, above) for the present packet is checked to see if the connection limit (‘limit_thresh’, in ‘struct fn_limit’) for the present packet would be exceeded if the packet connection is allowed. If the limit would be exceeded by allowing the packet, then the packet connection request is blocked, or reset, in accordance with the predetermined configuration set by the system administrator.

If it is determined that the packet connection limit would not be exceeded, then at step 520, the limit counter for the present packet connection is incremented. At step 525, an attempt is made to create new entry in state table 102 for this packet. If, at step 530, it is determined that a new state table entry was successfully created, then the connection request is allowed, at step 545. If, however, the attempt to create a new state table entry was unsuccessful, then the limit counter for the present packet is decremented at step 535, and the connection request is blocked, at step 540.

In an exemplary alternative embodiment, the fn_checklimit( ) code performs the following steps for both the first and the second calls [fn_checklimit(1) and fn_checklimit(2)]:

```
determine hash index of limit table hash bucket from
    source IP, destination IP, and destination TCP port of
    packet
if hash table bucket lock is not initialized
    acquire ipf_rw lock
    if initialize the limit table hash bucket lock lock
    release ipf_rw lock
acquire hash bucket lock
walk hash bucket entries looking for match of source IP
    address, destination IP address, or destination ULP port
(Note that in the second call the fn_checklimit, a walk of
    the hash table is avoided if the UID in the hash table head
    structure matches the saved UID in the packet summary.
    If the UIDs match, then no other thread has entered the
    same limit table entry in the hash list to be created; in
    addition, the position in the hash list where the new limit
    table entry is to be attached is now known; if the UIDs
    don't match then the hash list must be rewalked.)
if match, retrieve the rule pointer from limit table entry
    record check if the rule has been deprecated /*rule has
    ref count so it is not deleted*/
    if yes, return fn_continue to continue fn_limit_check( )
        processing
if match, determine if limit table entry current connection
    count allows a new connection
    no, check rule for logging, reset, block connection,
        return fn_block
    yes,
        increment limit count for this limit table entry
        add rule to packet summary /* required for add state */
        call fn_checkstate( ) to see if packet is part of a current
            connection
            if yes (there is a state entry) return fn_continue, else
        call fn_addstate( ) to add a new state entry
        if fn_addstate( ) fails
            decrement limit count
            check rule for logging, reset, block connection,
                return fn_block
        if fn_addstate( ) succeeds
            return pass
if there is no limit table entry which matches the packet,
    then
    if this is called from the beginning of fn_limit_check( )
        (first call) then return fn_continue so fn_limit_
        check( ) will continue processing the packet;
    otherwise, the call was from fn_limit_check( ) after the
        rules have been processed; call fn_addlimit( ) to cre-
        ate a new limit table entry and attach it to the hash
        list—unless there is no memory available the new
        limit table entry can always be added. If the
        fn_addstate( ) call fails, the newly created limit table
        entry is decremented or deleted.
```

At this point, a state check within fn_addlimit( ) (described below) is performed. First, the limit table entry is created and the limit table hash lock is released. The new limit table entry is removed if the addstate( ) call fails. Note that this is only true in the second call to fn_checklimit( ) [fn_checklimit(2)]. If the limit table entry already exists, such as in the first call, the limit table entry connection count is incremented (which guarantees the limit table entry will not be deleted), the lock is released, and then fn_addstate( ) is called. If fn_addstate( ) fails, the limit table hash lock is reacquired and the limit table entry connection count is decremented.

Note that a ‘deprecated rule’ is a rule that has been invalidated by the administrator through the user interface. When the final connection build using the now depreciated rule terminates, the rule structure is deallocated when the limit table entry structure is deallocated. At this point, the rule's reference is count (used to keep track of a rule that has been deleted) is only 1; the reference from the limit table entry. The limit entry will now use the new rule that replaces the deprecated rule.

Figure 6:
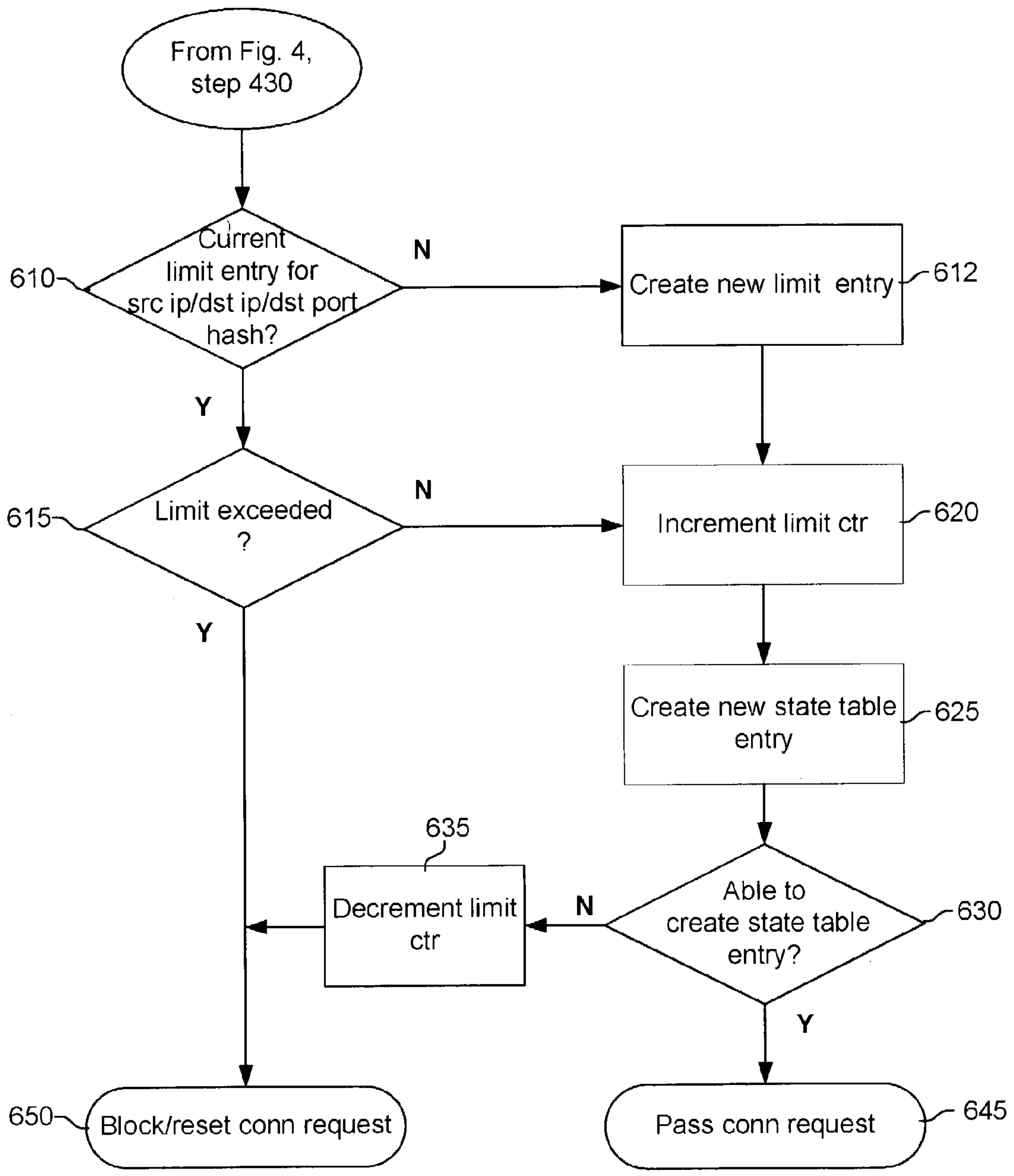
FIG. 6 is a flowchart illustrating exemplary steps performed in step 430 of FIG. 4.

FIG. 6 is a flowchart illustrating exemplary steps performed in the fn_checklimit(2) code called from step 430 of FIG. 4. As shown in FIG. 6, at step 610, a check is made to determine if there is a current entry for the present packet in limit table 103. If no such entry is found, then a new entry is created for this packet in limit table 103, at step 612.

If a matching entry for the packet is found, then at step 615, the current connection limit counter ('limit_cur', in 'struct fn_limit', above) for the present packet is checked to see if the connection limit ('limit_thresh', in 'struct fn_limit') for the present packet would be exceeded if the packet connection is allowed. If the limit would be exceeded by allowing the packet, then the packet connection request is blocked, or reset, in accordance with the predetermined configuration.

If it is determined that the packet connection limit has not been exceeded, then at step 620, the limit counter for the present packet connection is incremented. At step 625, an attempt is made to create new entry in state table 102 for this packet. If, at step 630, it is determined that a new state table entry was successfully created, then the connection request is allowed, at step 645. If, however, the attempt to create a new state table entry was unsuccessful, then the limit counter for the present packet is decremented at step 635, and the connection request is blocked, at step 650.

On the second call to fn_checklimit( ) [i.e., fn_checklimit (2)], fn_scanlist( ) has been called, and the "keep limit" rule which this packet matches has been located. Note that again, a check must be made to determine if a limit table entry might exist for this connection because a parallel thread could have created one. In an exemplary embodiment, the fn_checklimit (2) code performs the following steps:

```
Check if the rule the packet matched is a cumulative one
if yes, acquire rule's lock
  check current/maximum allowed connection count in
    rule
  if the current connection limit is less than the threshold
    increment count
    release lock
    call fn_addstate( ) to add new connection to state
      table,
      return pass
    if fn_addstate( ) fails
      acquire rule lock
      decrement count
      release rule lock
      check rule for logging, reset
      return block
  if limit count would be exceeded
    check rule for logging, reset, return block
if the rule is not cumulative, then call fn_addlimit( ).
```

When the limit type is cumulative, the strategy is to increment a rule's limit count while holding the rule lock. Then the lock is released to try to add a new connection to state table 102. If another instantiation subsequently accesses the rule, the rule's limit count will take in account the new connection. If the fn_addstate( ) fails, however, the rule lock will be reacquired, and the rule's limit count is decremented, setting everything back correctly, and then the connection will be blocked. This avoids having to hold the rule lock through the fn_addstate( ) call.

As indicated above, at step 610, if there is no current entry for the present packet in limit table 103, fn_checklimit( ) calls fn_addlimit( ) to create a new limit table entry. The calling arguments for fn_addlimit( ) are:

*fin—packet summary

*pentry—pointer to the limit table hash bucket entry

*last_pentry—pointer to last entry in hash bucket chain

Figure 7:
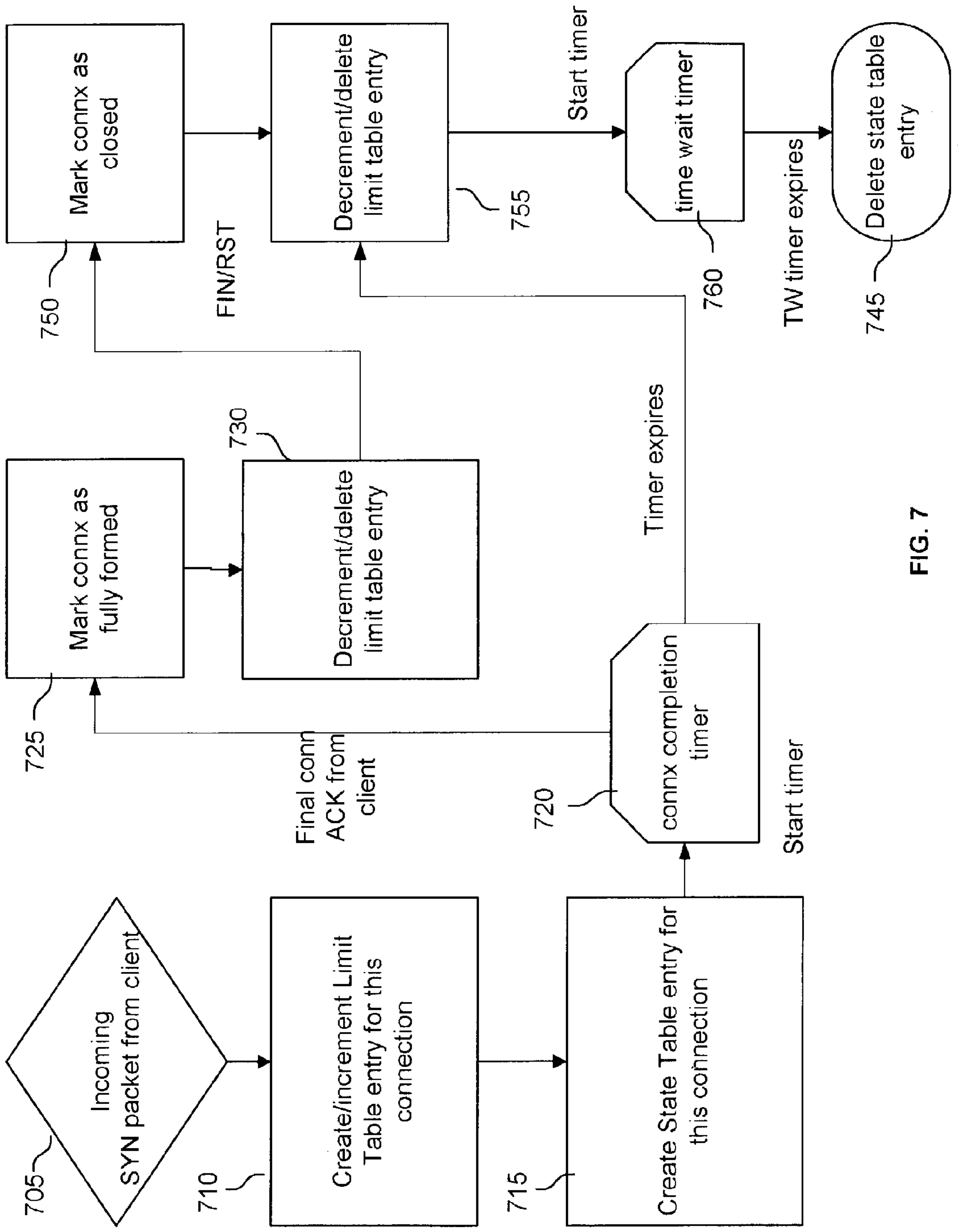
FIG. 7 is a flowchart with exemplary steps illustrating the flow of control in firewall 100.

Exemplary pseudocode for fn_addlimit( ), in an exemplary alternative embodiment, is shown below:

allocate a new limit table entry (note that in the final code limit entries will be allocated/deleted from a pre-allocated arena).

if no memory return −1, else zero out the new memory if last_pentry == 0, then this is the first entry in the hash chain, so attach it to pentry-> pnext, else last_pentry->pnext fill out the new limit table entry including src/dst IP addresses, tcp ports, maximum limit and type of entry from rule acquire rule lock update the rule's reference count and add a pointer in the entry limit to the rule release rule lock release limit table hash lock call fn_addstate( )

if fn_addstate( ) returns an error, call fn_remove_limit( ) to decrement or delete the new limit table entry Note that fn_remove_limit( ) is a derivative routine of fn_delimit( ) that walks the hash table to find the correct limit table entry because we may not have a valid pointer after releasing the lock Flow of Control FIG. 7 is a flowchart with exemplary steps illustrating the flow of control in DCA firewall system 100. As shown in FIG. 7, at step 705, an incoming SYN packet is received from client 120. At step 710, an entry in limit table 103 is either created or incremented, and at step 715, an entry in state table 102 is created, for the present connection packet. A connection completion timer is then started at step 720. If the timer expires, the limit table entry is either decremented or deleted at step 755.

When a final connection ACK is received from client 120, the connection is marked as fully formed, at step 725. At step 730, either an incoming FIN or RST packet is received, and the connection is advanced to the CLOSE_WAIT state, at step 750, and at step 755, the limit table entry is either decremented or deleted. At step 760, a 'time wait' timer is started, and when the timer expires, the state table entry for the present packet is deleted, at step 745.

The limit table entry connection count is decremented when fn_dellimit( ) is called from fn_tcpstate( ) or fn_tcp_age( ) when a previously established connection receives a FIN or RST TCP packet from either the client or server and advances to the CLOSE_WAIT state, indicating that the connection is being disconnected. Alternatively, fn_delimit( ) can be called fromfn_delstate( ) when the state is deleted because of the connection is timed-out or flushed by the administrator. The arguments for fn_dellimit are:

pointer to state table entry pointer to limit table entry

Exemplary pseudocode for fn_dellimit( ) is shown below.

if the limit type is "cumulative," decrement the rule's current connection count and return, else use the src/dst IP addresses and destination port stored in the state table entry to find the hash into the limit table entry hash table lock the hash table bucket entry, controlling access to the bucket's limit entries Use the limit table entry argument pointer to access the limit table entry decrement the current connection count in the limit table entry
if the connection count for the limit table entry is now zero
check if rule's reference count >0
acquire rule lock
decrement the rule's reference count
if the reference count is now zero
release rule lock
delete rule
delete the limit table entry
release the limit table hash entry lock.
Note that fn_remove_limit( ) is a derivative routine of fn_delimit( ) that walks the hash table to find the correct limit table entry because we may not have a valid pointer after releasing the lock Summary Logging The present method of logging is based on the use of summary log records. When logging is enabled, all packets which cause a configured connection limit to be exceeded are logged by DCA firewall system 100. Typically, these will be SYN packets. Over the life of each entry in limit table 103, each connection attempt by a client 120 is recorded, if the attempted connection would have exceeded the current limit, at step 435 in FIG. 4. The fields 'fn_threshold' and 'fn_limit_excd' are stored in rule table 105. The fn_threshold field specifies the maximum number of concurrent established connections that are allowed for any source IP/destination IP, destination port entry. If the limit type is cumulative, then fn_limit is checked against this. The fn_limit_excd field stores the number of times the limit would have been exceeded by a particular client entry. This field is incremented by fn_checklimit( ) every time the current limit exceeds the configured limit.

Figure 8:
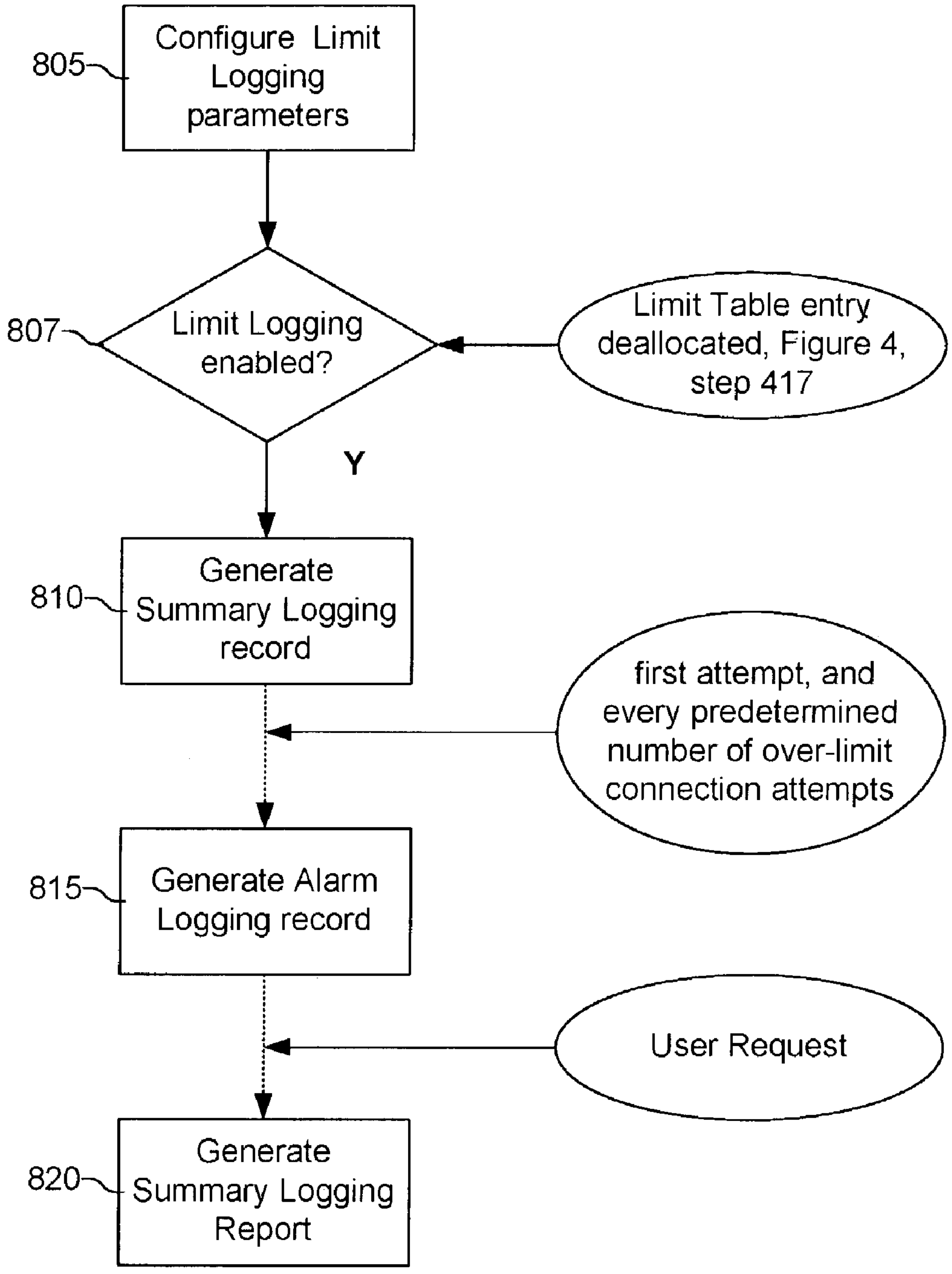
FIG. 8 is a flowchart illustrating exemplary steps performed in the summary logging aspect of the present system.

FIG. 8 is a flowchart illustrating exemplary steps performed in the summary logging aspect of the present system. The summary logging operation is best understood by viewing FIG. 8 in conjunction with FIG. 4. As shown in FIG. 8, in step 805, a user, such as a system administrator, initially configures DCA firewall system 100 with parameters that control the operation of the presently described summary logging function. These parameters include information indicating whether to enable or activate the summary logging process, and other information, including a frequency count in each keep-limit rule. This frequency count is used by a DCA limit logging function to determine how often to generate an 'alarm logging record'. Alarm logging records are stored in the normal system log file 104. The alarm logging records inform the administrator if a particular client or system is trying to repeatedly establish a number of connections in excess of its configured limit, because, in the present case, the normal log file 104 is used to record these 'abnormal' events.

If summary logging is enabled (at step 807), then, when the limit table entry is deallocated because there are no more active connections associated with it (at step 417 in FIG. 4), a summary logging record is generated at step 810. The summary logging record contains information including client (or subnet) IP indicia, an indication of when the first over-limit connection attempt was made, and a total of the number of over-limit connection attempts. These summary logging records are written to summary logging file 104S, and they can be collated by a report program initiated either by a system administrator, or produced automatically at predetermined intervals. The first time a client attempts a connection that exceeds the current connection limit, and every 'frequency number' of over-limit connection attempts, an 'alarm logging record' is generated, at step 815. In response to a user request, the present system 100 visits all of the active limit table entries and generates a summary logging report from them, at step 820, to accurately inform the system administrator of current system activity.

A typical log record, with 'log limit' set in the rule, may record information including (1) date stamp and time; (2) local net carrying interface packet; (3) local endpoint; (4) remote endpoint; (5) protocol; (6) TCP flags; (7) connection limit; (8) packet direction; (9) rule number/group rule number; (10) filter decision; and (11) configured limit, current limit count, and limit exceeded count.

Instructions that perform the operations discussed with respect to FIGS. 2 and 4-8 may be stored on computer-readable storage media. These instructions may be retrieved from the media and executed by a processor, such as processor 112 of FIG. 1, to direct the processor to operate in accordance with the present system. The instructions may also be stored in firmware. Examples of storage media include memory devices, tapes, disks, integrated circuits, and servers.

Certain changes may be made in the above methods and systems without departing from the scope of the present system. It is to be noted that all matter contained in the above description or shown in the accompanying drawings is to be interpreted as illustrative and not in a limiting sense. For example, the items shown in FIGS. 1 and 3 may be constructed, connected, arranged, and/or combined in other configurations, and the set of steps illustrated in FIGS. 2 and 4-8 may be performed in a different order than shown without departing from the spirit of the present invention.

What is claimed is:

1. A method for controlling connections from an IP entity, having a source IP address, to a server comprising the steps of:
configuring a limit count representing a number of concurrently allowable connections between the IP entity and the server;
receiving an incoming IP packet;
processing the packet to determine said source IP address and a destination IP address for the packet;
creating an entry in a limit table for the IP entity, if no entry for that IP entity exists in the table, wherein the entry is identified by said source IP address and destination IP address;
determining, by reference to the limit count and the entry in the limit table, whether a pending connection should be allowed for the packet;
allowing the connection, and incrementing the limit count for the entry if the attempted connection would not exceed the limit count for the IP entity; and
blocking the packet if the attempted connection would exceed the limit count for the IP entity;
wherein each pending packet that exceeds the limit count is considered to be an over-limit connection, for which indicia of the pending packet is stored in a logging record in a logging file when there are no more active connections associated with the IP entity;
generating a summary logging record indicating a total of the number of connection attempts, by said IP entity, that exceed said limit count;
writing each said summary logging record to a summary logging file; and
collating the summary logging records in the summary logging file.

2. The method of claim 1, wherein the IP entity is a client.

3. The method of claim 1, wherein the IP entity is a subnet.

4. The method of claim 1, wherein the incoming packet is a TCP/IP packet.

5. The method of claim 1, wherein the pending connection is determined by the destination IP address for the packet.

6. The method of claim 1, wherein the pending connection is determined by the destination TCP port for the packet.

7. The method of claim 1, wherein the packet is blocked by issuing a reset for the packet.

8. The method of claim 1, wherein the determining step further comprises:

entering, into a rule table, a set of rules specifying a range of source and destination addresses and destination ports, and a maximum number of said concurrently allowable connections between a particular source IP address and a destination server IP address;

determining which one of the rules in the rule table the incoming packet matches; and applying, to the incoming packet, the one of the rules that matches the incoming packet.

9. The method of claim 8, wherein the set of rules includes a default rule that identifies all other clients not identified by any other said rules in the set of rules; and wherein the default rule subjects said other clients to a pre-configured limit count.

10. The method of claim 1, wherein the limit count is stored in a rule by individual IP address.

11. The method of claim 1, wherein the limit count is stored in a rule by IP subnet range;

wherein each IP entity address has an individual limit configured to the subnet; and wherein all addresses in the subnet range share a cumulative limit.

12. The method of claim 1, wherein said indicia are stored in the logging record when an entry in the limit table is deallocated.

13. The method of claim 1, wherein the summary logging record indicates when the first attempt was made to establish said over-limit connection.

14. The method of claim 1, wherein:

a frequency count is configured to determine the frequency with which an alarm logging record is generated; and wherein the alarm logging record is generated on the first over-limit connection attempt and on every number of said over-limit connection attempts corresponding to the frequency count.

15. A method for filtering packets sent from e-mail clients to an SMTP server comprising the step of:

limiting the number of concurrently active connections between a particular one of the clients and a TCP port for a specific said SMTP server, by restricting the number of concurrent connections from specific ones of the clients to a pre-configured limit count, wherein the pre-configured limit count indicates at least one of allowable connections between specific ones of the clients and said SMTP server and allowable connections between a subnet range and said SMTP server;

wherein indicia of each packet that exceeds the pre-configured limit count is stored in a logging record in a logging file when there are no more active connections associated with the email clients;

generating a summary logging record indicating a total of the number of connection attempts by said email clients that exceed said pre-configured limit count;

writing each said summary logging record to a summary logging file; and collating the summary logging records in the summary logging file.

16. The method of claim 15, wherein the limit count is determined by reference to a rule table containing rules indicating a maximum number of concurrently allowable connections between certain said clients and the server.

17. The method of claim 16, wherein one of the rules configures the limit count for a specific subnet, and a connection request is rejected if the connection requested would cause the limit count for the subnet to be exceeded.

18. A method for controlling connections from an IP entity to a server comprising the steps of:

configuring a rule table including a set of rules indicating a maximum number of concurrently allowable connections between the IP entity and the server;

receiving an incoming IP packet;

processing the packet to determine the source and destination IP addresses for the packet;

creating an entry in a limit table for the IP entity, if no entry for that IP entity exists in the limit table, wherein the entry is identified by said source IP address and destination IP address;

determining whether an incoming packet matches one of the rules in the rule table;

determining, by reference to the rule table and the entry in the limit table, whether a pending connection should be allowed for the packet;

allowing the connection, and incrementing a limit count for the entry if the attempted connection would not exceed the maximum number of concurrently allowable connections for the IP entity;

blocking the packet if the attempted connection would exceed the maximum number of concurrently allowable connections for the IP entity;

wherein the set of rules includes a default rule that identifies all other clients not identified by any other said rules in the set of rules; and wherein the default rule subjects said other clients to a pre-configured limit count on allowable connections between said other clients and the server;

wherein indicia of each said packet that exceeds the maximum number of concurrently allowable connections is stored in a logging record in a logging file when there are no more active connections associated with the IP entity;

generating a summary logging record indicating a total of the number of connection attempts by said IP entity that exceed said maximum number of concurrently allowable connections;

writing each said summary logging record to a summary logging file; and collating the summary logging records in the summary logging file.

19. The method of claim 18, wherein the summary logging record indicates when the first said attempted connection was made that exceeded the maximum number of concurrently allowable connections.

20. The method of claim 18, wherein:

a frequency count is configured to determine a frequency with which an alarm logging record is generated for said attempted connections that exceed the maximum number of concurrently allowable connections; and wherein the alarm logging record is generated on every number of connection attempts that exceed the maximum number of concurrently allowable connections, on a basis corresponding to the frequency count.

21. A system for controlling connections from clients to a server, comprising:

a processor and associated memory;

a rule table, stored in said memory, including rules specifying a range of source and destination addresses and destination ports, and a maximum number of concurrently allowable said connections between a particular client source IP address and a destination server IP address;

a limit table, stored in said memory, for storing a number of present connections established between each of the clients and the server;

a filter, executed on the processor, including a connection limit checking function that uses said rules to determine the maximum number of concurrently allowable said connections for each one of said clients having a pending connection request; and a logging file containing a logging record for each packet;

wherein the pending connection request is blocked if the total number of said present connections would exceed the maximum number for the source IP address, if the pending connection request were allowed; and wherein client IP addresses not having a corresponding rule in the rule table are assigned a default individual limit for the maximum number of concurrently allowable connections between said client IP addresses that do not have the corresponding rule in the rule table and the server;

wherein indicia of each said packet that exceeds the maximum number is stored in the logging record when there are no more active connections associated with the client that sent the packet; and generating a summary logging record indicating a total of the number of connection attempts by said IP entity that exceed said limit count.

22. The system of claim 21, wherein the maximum number of concurrently allowable said connections can be set to a cumulative count for all said clients that match the rules.

23. The system of claim 21, wherein each said summary logging record is automatically written to a summary logging file.

24. The method of claim 21, wherein the maximum number of concurrently allowable said connections is stored in one of the rules by individual IP address.

25. The method of claim 21, wherein the maximum number of concurrently allowable said connections is stored, by IP subnet range, in one of the rules;

wherein each IP entity address has an individual limit associated with the subnet; and wherein all addresses in the subnet range share a cumulative limit.

26. A system for controlling connections from an IP entity, having an IP address, to a server, comprising the steps of:

a rule table containing a set of rules indicating a number of concurrently allowable connections between the IP entity and the server;

means for receiving an incoming IP packet;

means for processing the packet to determine the source and destination IP addresses for the packet;

means for creating an entry in a limit table for the IP entity, if no entry for that IP entity exists in the limit table, wherein the entry is identified by said source IP address and destination IP address;

means for determining whether an incoming packet matches one of the rules in the rule table;

means for determining, by reference to the rule table and the entry in the limit table, whether a pending connection should be allowed for the packet;

means for allowing the connection and incrementing a limit count for the entry if the attempted connection would not exceed the limit count for the IP entity;

means for blocking the packet if the attempted connection would exceed the limit count for the IP entity;

wherein the set of rules includes a default rule that identifies all other clients not identified by any other said rules in the set of rules; and wherein the default rule subjects said other clients to a pre-configured limit count on allowable connections between said other clients and the server;

wherein indicia of each said packet that exceeds the maximum number of concurrently allowable connections is stored in a logging record in a logging file when there are no more active connections associated with the IP entity;

means for generating a summary logging record indicating a total of the number of connection attempts by said IP entity that exceed said maximum number of concurrently allowable connections;

means for writing each said summary logging record to a summary logging file; and means for collating the summary logging records in the summary logging file.

27. A software product comprising instructions, stored on computer-readable media, wherein the instructions, when executed by a computer, perform steps for controlling connections from an IP entity to a server, comprising:

configuring a rule table indicating a number of concurrently allowable connections between the IP entity and the server;

receiving an incoming IP packet;

processing the packet to determine the source and destination IP addresses for the packet;

creating an entry in a limit table for the IP entity, if no entry for that IP entity exists in the limit table, wherein the entry is identified by said source IP address and destination IP address;

determining whether an incoming packet matches one of the rules in the rule table;

determining, by reference to the rule table and the entry in the limit table, whether a pending connection should be allowed for the packet;

allowing the connection, and incrementing the limit count for the entry if the attempted connection would not exceed the limit count for the IP entity;

blocking the packet if the attempted connection would exceed the limit count for the IP entity;

wherein the set of rules includes a default rule that identifies all other clients not identified by any other said rules in the set of rules; and wherein the default rule subjects said other clients to a pre-configured limit count on allowable connections between said other clients and the server;

wherein indicia of each said packet that exceeds the maximum number of concurrently allowable connections is stored in a logging record in a logging file when there are no more active connections associated with the IP entity;

generating a summary logging record indicating a total of the number of connection attempts by said IP entity that exceed said maximum number of concurrently allowable connections;

writing each said summary logging record to a summary logging file; and collating the summary logging records in the summary logging file.

* * * * *